United States Patent Office 2,995,419
Patented Aug. 8, 1961

2,995,419
METHOD FOR DISSOLVING LANTHANUM FLUORIDE CARRIER FOR PLUTONIUM
Daniel E. Koshland, Jr., Cambridge, Mass., and John E. Willard, Madison, Wis., assignors to the United States of America as represented by the United States Atomic Energy Commission
No Drawing. Filed July 18, 1950, Ser. No. 174,592
15 Claims. (Cl. 23—14.5)

The present invention relates in general to processes for the production of plutonium, and more particularly to a method for effecting improved dissolution of lanthanum fluoride carrier precipitates containing plutonium, and for improving oxidation of plutonium in the resulting solutions.

As is known, plutonium—more specifically the 239 isotope of plutonium—is conventionally produced by transmutation from uranium effected by subjecting natural uranium to neutron irradiation. In current practice, the product thus obtained is ordinarily a mass of irradiated uranium containing a concentration of the order of 0.02% plutonium and a like concentration of uranium fission products. However, the presence of even small amounts of uranium or fission products usually interferes with the ultimate applications of plutonium. This is especially true with respect to the fission products—isotopes having atomic numbers ranging predominantly from 30 to 63—which are in general highly radioactive and therefore greatly deleterious from both physiological and technical standpoints. Accordingly, for successful utilization, the small proportion of plutonium so produced must be isolated and recovered from the materials associated with it in the irradiated mass.

Employing customary procedures, initially the plutonium, accompanied by much of the fission product contamination, is quite readily separated from the bulk of uranium. This may be done by dissolving the irradiated mass in aqueous nitric acid, solubly complexing uranium with sulfate ion, and removing from solution the often minute concentration of plutonium in its tetravalent state by carrier precipitation upon bismuth phosphate. Then, for the exceedingly difficult tasks of isolating plutonium from the fission product contamination and concentrating the so decontaminated plutonium, conventional procedures involve pluralities of cycles of separate selective carrier precipitations of plutonium and of fission products from aqueous solution. Pre-eminent among such carrier precipitation cycles is that employing lanthanum fluoride first to selectively carry fission products and then, under altered conditions, to selectively carry plutonium. It is with such lanthanum fluoride carrier precipitation operations that the present invention is primarily concerned.

Considering the conventional lanthanum fluoride cycle in greater detail, lanthanum fluoride characteristically carrier precipitates tetravalent plutonium highly efficiently, but leaves hexavalent plutonium remaining in solution. Concurrently, lanthanum fluoride carries some fission product species and other contaminants well, and some poorly, under both plutonium oxidation conditions involved. By virtue of these considerations, processing plutonium through successive lanthanum fluoride carrier precipitation operations while alternating the Pu oxidation state between the tetravalent and hexavalent will gradually reduce the fission product contamination. That is, in more detail, lanthanum fluoride is precipitated in an aqueous nitric acid solution containing the plutonium in tetravalent state, whence plutonium is co-precipitated, leaving behind in solution a substantial portion of fission products and other sources of contamination; such operation is termed "product precipitation." The carrier precipitate containing plutonium is then separated from its supernatant, dissolved to form an aqueous nitric acid solution, and the plutonium oxidized to the hexavalent state. In the resulting solution, lanthanum fluoride is again precipitated, ordinarily carrying down a substantial portion of fission products and other contaminants and leaving a preponderant portion of the plutonium in solution; such operation is termed "by-product precipitation." After removing the by-product precipitate, the supernatant solution, containing the bulk of the original plutonium, may be treated by another lanthanum fluoride product precipitation, or other plutonium purification operation. This cycle, comprising product precipitation followed by by-product precipitation, is conventionally repeated a number of times until sufficient plutonium decontamination is effected and then usually continued through several more cycles, employing progressively smaller amounts of precipitate and solution, until the small amount of plutonium is concentrated sufficiently for direct precipitation without a carrier.

While for the most part, the cycle is conducted straightforwardly as described, complication does arise in the step of dissolving the product precipitate. Lanthanum fluoride is quite insoluble even in strong mineral acids. Although fuming with concentrated acid, specifically $H_2SO_4$, for extended periods can ultimately afford operable direct dissolution on a laboratory scale, the major operational and corrosion problems which would be involved in plant scale application render such procedure quite unfeasible for production operation. In view of such resistance to direct acid dissolution, it had become conventional to dissolve indirectly by metathesizing the lanthanum fluoride to lanthanum hydroxide, which advantageously carries the plutonium and dissolves in aqueous nitric acid. Briefly, a typical metathesis operation may comprise the following: The plutonium-carrying lanthanum fluoride precipitate, separated from its original supernatant, is slurried in several volumes of 10 to 15 percent KOH or NaOH solution for a period of 1 to 2 hours between about 50° and 85° C. Exchange of hydroxyl ions for fluoride ions in the lanthanum precipitate occurs, forming insoluble lanthanum hydroxide which retains the plutonium, while the fluoride ions go into solution. The metathesized material is separated from the solution and carefully washed with water to remove fluoride ion as completely as practicable. Alternatively, the metathesis may be assisted by initial dissolution of the lanthanum fluoride precipitate in a very large quantity of potassium carbonate solution. For example, 45 volumes, in two steps of addition, of a 45 to 50 percent solution of potassium carbonate may be added to the lanthanum fluoride precipitate and the resultant slurry maintained at a temperature of 75° to 90° C. for about 1 to 2 hours. The bulk of the lanthanum fluoride precipitate tends to slowly dissolve in the potassium carbonate solution. The resulting solution is made about 15% in KOH or NaOH, by adding 40% solution of alkali, to form the lanthanum hydroxide precipitate. This precipitate is separated as by centrifugation and carefully washed to remove fluoride ion. The washed materials resulting from either of the foregoing metathesis procedures may then be treated with dilute nitric acid or other suitable solvent to yield a solution wherein the plutonium may be subjected to oxidation and then to lanthanum fluoride by-product precipitation.

It should be stated here that the hereinabove-discussed general lanthanum fluoride cycle and metathesis operation for dissolution comprise the inventions and concepts of others, and do not, per se, constitute a part of the present invention. Details of those processes are more fully set forth in co-pending applications as for example:

Serial No. 745,108, filed April 30, 1947, in the names of Isadore Perlman, Stanley G. Thompson, and Burris B. Cunningham, for Metathesis of Bismuth Phosphate.

Serial No. 737,723, filed March 27, 1947, now U.S. Patent No. 2,931,702, issued April 5, 1960, in the name of Robert B. Duffield for Metathesis of Lanthanum Fluoride Precipitate.

Serial No. 652,829, filed March 7, 1946, now U.S. Patent No. 2,912,303, issued November 10, 1959, in the name of Bernard A. Fries, for Dissolution of Fluoride Type Compounds.

Accordingly, the particular type of lanthanum fluoride cycle employed is not a limitation upon the present invention.

While the described standard metathesis method does accomplish the difficult dissolution of lanthanum fluoride carrier precipitates in a reasonable volume of acidic solution, it has not proven to be unqualifiedly satisfactory for the purpose. In general, it is rather tedious and time-consuming, and normally some plutonium is lost in the supernatant alkali solution upon removing the metathesized lanthanum hydroxide. Also, the produced metathesate is generally not completely soluble in the subsequent aqueous nitric acid dissolution step; disadvantageously, the non-dissolving portion, presumed to be unmetathesized lanthanum fluoride, normally withholds part of the plutonium. The magnitude of this non-dissolving lanthanum residue and the proportion of the plutonium it retains are often quite erratic; in some instances the effect is so serious that over 90% of the plutonium content is withheld. Furthermore, often upon attempting dissolution of the metathesate, cloudiness appears in the acid system, at times becoming more marked upon dilution, seeming to indicate that an undesirable colloidal dispersion, rather than a true solution, of the lanthanum has been obtained. Too, even when proper dissolution of much of the metathesate appears to have been achieved, considerable difficulty is ofttimes encountered in satisfactorily accomplishing subsequent oxidation of plutonium to the hexavalent state; it is not uncommon to find that not more than 20% of the plutonium in the obtained solution is oxidizable by procedures which generally afford virtually complete plutonium oxidation. In view of these, and other disadvantageous characteristics of the metathesis dissolution procedure, it has become highly desirable that improved methods be found for overcoming such troublesome difficulties and affording more effective, preferably direct dissolution of lanthanum fluoride carrier precipitates. The present invention provides such a method.

Accordingly, one object of the present invention is to provide a new and improved method for effectively dissolving lanthanum fluoride precipitates, especially lanthanum fluoride carrier precipitates bearing plutonium values.

Another object is to provide such a method which is applicable in place of or complementary with standard alkali metathesis procedures for the purpose.

A further object is to provide a new and improved method for enhancing dissolution of alkali metathesates of lanthanum fluoride precipitates.

Still another object is to provide such a method which renders plutonium values treated thereby more readily oxidizable from tetravalent to hexavalent oxidation states.

Additional objects will become apparent hereinafter.

In accordance with the present invention, lanthanum fluoride precipitates, especially lanthanum fluoride carrier precipitates carrying plutonium values, are dissolved by a new and improved method which comprises contacting said precipitates with an aqueous, acidic solution of tetravalent zirconium in a cationic state, thereby effecting dissolution of said precipitates therein. Applicants have discovered that cationic tetravalent zirconium in aqueous solution is uniquely effective in solubilizing lanthanum fluoride precipitates, as well as plutonium values contained therein. For instance, while lanthanum fluoride is markedly insoluble in dilute nitric acid, it has been found that incorporation of $Zr^{+4}$ in the dilute $HNO_3$ can enable the resulting acid solution to quickly and directly dissolve as much as an equal volume of lanthanum fluoride precipitate. Not only will this procedure thus operate upon such great relative quantities of precipitate, but the dissolution it thereupon effects has proven to be of singularly high quality. That is, the procedure is characteristically capable of virtually complete dissolution of lanthanum fluoride and carried plutonium values, without leaving appreciable quantities of unattackable lanthanum fluoride residue, or resulting in a colloidal suspension rather than a true solution. Also, the procedure does not appear to detract from the oxidation susceptibility of plutonium values so dissolved; in fact, the resultant presence of zirconium gives evidence of enhancing subsequent plutonium oxidation operations. Furthermore, it has been found that lanthanum so dissolved may be readily reprecipitated as fluoride, despite the presence of the solubilizing zirconium, by merely adding fluoride ion in an excess over the zirconium content, accordingly simplifying procedures for subsequent by-product precipitations. Having such beneficial attributes, the present process clearly affords significant practical advantages over earlier processes for the purpose.

In conducting the present process, the exact compositions of satisfactory acidic zirconium solutions employed for the dissolution operation are subject to considerable variation. Naturally, anions of the zirconium compound and acid employed, as well as any other extraneous material permitted in the solution, should be of such nature as not to precipitate the zirconium or lanthanum or otherwise deleteriously interfere, through their own particular activity, with the dissolution operation. The nitrate ion, being eminently satisfactory in this respect, is preferred for the purpose; accordingly the particularly preferred dissolving solution is an aqueous nitric acid solution of zirconyl nitrate. With regard to the amount of zirconium employed, it has been found that weight ratios down to as low as approximately 1:1 of zirconium to lanthanum desired to be dissolved afford satisfactory solubilization. On the basis of total weight of the preferred reagent, zirconyl nitrate, this ratio is equivalent to about 9:5 of zirconyl nitrate to lanthanum fluoride. As far as total quantity of solution is concerned, use of as little as about a liter of aqueous zirconium solution per 140 grams of lanthanum fluoride precipitate has been observed to ordinarily provide sufficient solution volume for complete dissolution. In using a strong mineral acid as $HNO_3$, high acid concentrations are normally unnecessary; a concentration of only 1 molar $HNO_3$ has demonstrated to be in general, fully effective for the purpose. In the light of these various quantitative considerations, the preferred reagent concentrations, found well suited for providing a solution of a general applicability for dissolving lanthanum fluoride precipitates, are 1 M $HNO_3$ and 250 grams/liter $ZrO(NO_3)_2$. In using a solution of such concentrations, it has proven advantageous to employ at least approximately 7 liters thereof for each kilogram of $LaF_3$ to be dissolved, in order to provide sufficient solution volume for complete dissolution. However, it is usually preferred to use about double this amount, wherever minimization of resultant solution volume is not particularly essential, so as to provide a practically-desirable excess of solvent. Upon contacting lanthanum fluoride precipitates with acidic zirconium solutions of the described nature, preferably with mild agitation, dissolution normally proceeds rapidly, at room temperature until substantially all of the lanthanum fluoride, as well as carried plutonium values, if present, are dissolved.

This simple and direct dissolution method has proven to be ideally adapted for dissolving lanthanum fluoride product precipitates in the conventional lanthanum fluoride cycle for decontamination and concentration of plutonium. The product precipitate, normally consisting of a bulk of lanthanum fluoride, containing a very small amount of plutonium in the form of $PuF_4$, and fission product contamination, is readily dissolved by the disclosed method. That the plutonium is actually concomitantly dissolved has been confirmed by separate tests, which have demonstrated that, similar to the effect upon $LaF_3$, acidic zirconium solution likewise solubilizes and dissolves pure $PuF_4$. Since the present dissolution method does not involve the discarding of a supernatant, it entirely avoids the plutonium loss attending such an operation in the former alkali methathesis dissolution procedure. In continuing through the cycle, the tetravalent plutonium in the resulting solution may be readily oxidized to the hexavalent state by conventional procedures, without encountering the marked opposition to complete oxidation so often met in solutions derived by the metathesis procedure. Addition of customary oxidants for the purpose, for example ca. 0.5–1.0 N $K_2Cr_2O_7$, preferably catalyzed by about 0.01 M $Co^{+2}$, or ca. 0.1 M $Na_2S_2O_8$, catalyzed by about 1 mg./ml. $AgNO_3$, both under elevated temperature conditions of the order of 65°–75° C., will generally afford virtually complete and fully satisfactory oxidation in a reasonable time. Then, with the plutonium in its oxidized hexavalent state, by-product precipitation is simply effected, with normal efficacy, by adding fluoride ions, preferably as HF, until the lanthanum is precipitated, as $LaF_3$. The amount of HF added for this purpose should preferably be sufficient to increase the fluoride ion content of the system to four times the zirconium ion molarity, and in addition to this, to supply a stoichiometric excess over the total lanthanum present, so as to preciptate the entire bulk of the lanthanum present.

During the by-product precipitation, considerable quantities of zirconium may co-precipitate with the lanthanum fluoride. However, the occurrence of such a co-precipitate is normally of little consequence, since it does not characteristically carry plutonium. The degree to which such fluoride precipitate of zirconium is so thrown down at this point is dependent primarily upon the particular solution conditions employed during the previous dissolution and oxidation steps. It has been found that high temperatures, low acidities, and high concentrations of zirconium tend to convert some of the zirconium to a fluoride-precipitatable form. Accordingly, the extent of such co-precipitation may be mitigated, if desired, by avoiding elevated temperatures and $HNO_3$ concentrations below about 1 N, or by diluting the zirconium concentration, preferably to below about quarter molar, before effecting the by-product precipitation.

After the by-product precipitate is removed and disposed of, reduction of the hexavalent plutonium, having remained in the solution, by conventional procedures is not interfered with by the presence of the zirconium. The efficacy of customary procedures for the purpose, for instance addition of four- or five-fold stoichiometric excesses over the oxidant previously added, of $SO_2$, $Fe^{++}$, or $AsO_2^-$, has been found to be substantially insensitive to the large amount of zirconium present. Product precipitation is then simply effected by adding $La^{+++}$, while maintaining the acidity of the system at approximately 1 N $HNO_3$, to precipitate excess fluoride ion in the system as $LaF_3$, thereby carrier precipitating plutonium in its reduced tetravalent state from the solution. Since by precipitating in this way, no additional fluoride ion is added, normally only very little, if any, of the remaining zirconium co-precipitates to contaminate the product precipitate. Unless the solution has been excessively diluted during the cycle, fully effective carrier precipitation of the plutonium ordinarily may be achieved during this step with considerably less $LaF_3$ than was used in the precipitate originally dissolved, accordingly resulting in desirable concentration of the plutonium. Thus, by combination, in this manner, of the present dissolution method with such lanthanum fluoride cycles, the benefits of simplified and improved product precipitate dissolution, as well as effective elimination of serious oxidation difficulties formerly encountered after metathesis dissolution, are fully accrued, without the resulting presence of zirconium appreciably interfering with, or requiring radical alteration of, the operations throughout the remainder of the cycle.

While the present method is thus fully capable, alone, of dissolving lanthanum fluoride precipitates, it may also be used to complement dissolution of such precipitates by conventional alkali metathesis procedures, such as hereinbefore described. More particularly, it is in further accordance with the present invention to employ, in processes for the derivation of an aqueous solution from a lanthanum fluoride precipitate especially a lanthanum fluoride carrier precipitate carrying plutonium values, comprising converting said lanthanum fluoride precipitate to substantially a lanthanum hydroxide precipitate by a metathesis reaction effected by means of contacting the lanthanum fluoride with an aqueous alkali hydroxide solution, thereupon separating the consequently-converted precipitate from its supernatant solution, and then admixing the separated precipitate with an aqueous acidic solution to thereby dissolve it therein, the improvement step which comprises incorporating in said aqueous, acidic solution tetravalent zirconium in dissolved cationic state. Applicants have found that some of the discussed characteristic difficulties of conventional alkali metathesis procedures can be just as effectively overcome by their $Zr^{+4}$ treatment, when applied in this manner, as when it is completely substituted for the metathesis method.

In particular, such incorporation of $Zr^{+4}$ in the methathesate dissolving solution has demonstrated to be especially effective in mitigating, and usually capable of wholly eliminating, the occurrence therein both of amounts of undissolvable lanthanum containing residue, and of cloudiness in the aqueous system obtained. These lanthanum residues and cloudy suspensions, as alluded to hereinbefore, are generally encountered in practical applications of the metathesis technique, and presumably are both constituted of partially or wholly unmetathesized $LaF_3$. Both are highly undesirable, not only in that they manifest incomplete dissolution of the lanthanum precipitate, but also because they often seriously prevent major portions of carried plutonium values from satisfactorily going into solution. Commonly, the magnitude of these unfavorable effects varies erratically between ostensibly identical runs, making the efficiency of any particular metathesis dissolution operation rather unpredictable. Applicants have observed that, using the outlined procedure, such troublesome residues and suspensions can normally be quickly and often completely dissolved by adding merely small concentrations, say of the order of as little as a gram or so per liter, of tetravalent zirconium to the system. Better still, by the simple expedient of adding the zirconium to the dissolving solution before its admixture with the metathesate to be dissolved, the occurrence of such residues and cloudiness ordinarily can be consistently prevented at the outset. In practice, especially in plutonium production applications, regular use of such a preventive operation has proven to be a highly profitable measure.

In so applying the present method to metathesate dissolution, it is particularly preferred, again, that the zirconium compound employed be zirconyl nitrate, and that the dissolving acid be aqueous $HNO_3$. Generally speaking, the method may be simply incorporated in previously-conventional metathesate dissolution operations, without otherwise necessitating changes in basic procedure or amounts or concentrations of the dissolving acid employed. For example, an operation typifying such previously-conventional dissolution procedures satisfactory here comprises admixture of the $La(OH)_3$ precipitate with about 4 to 4.5 liters of 60% $HNO_3$ per kilogram of $La^{+3}$ in the precipitate, agitation for say a half hour, and then dilution to approximately 1 N $HNO_3$, resulting in a solution volume of the order of 25 to 30 liters per kilogram of $La^{+3}$ involved. To such an operation, the present improvement step is readily combined by merely adding the $Zr^{+4}$, in soluble form, to the dissolving solution, either before, during or after the admixture with the metathesate or dilution of the acid. With respect to the amounts of added $Zr^{+4}$ required for effective dissolution of obtaining lanthanum-containing residues and cloudy suspensions, it may initially be said that any amount, however small, added will have some beneficial dissolving effect. As $Zr^{+4}$ concentrations are increased, progressively greater amounts of residue and suspension dissolve, up to an ultimate $Zr^{+4}$ concentration at and above which complete dissolution is effected. The precise value of such quantity of $Zr^{+4}$ necessary for complete dissolution is usually different for each individual case, depending directly on the amount of residue and suspension encountered. In practice, in cases where the metathesate is already in the system, such concentration may easily be provided merely by adding $Zr^{+4}$ until the lanthanum residue or suspension visibly disappears. However, where the $Zr^{+4}$ is alternatively incorporated in the solution before its admixture with the metathesate, the changeableness of the amounts of residue and suspension makes use of ample excesses of $Zr^{+4}$ advisable. As a general guide to quantities of $Zr^{+4}$ suitable in this regard, it has been observed that where metathesis has been carefully conducted in accordance with the conventional procedures hereintofore cited, about a half gram $Zr^{+4}$ per liter is normally an adequate concentration to eliminate any cloudy lanthanum suspension which may form. Under similar circumstances, about 1 gram of $Zr^{+4}$ per 10 grams of total lanthanum in the system has demonstrated to be generally satisfactory for prevention of lanthanum residue remaining undissolvable therein. In the event that some lanthanum residue or suspension does remain, despite the presence of these amounts of zirconium, it may usually be dissolved readily by adding more $Zr^{+4}$ to the system. Accordingly, it is the preferred procedure to regularly incorporate such a reasonable amount of $Zr^{+4}$ in the $HNO_3$ solution before its admixture with the metathesate, in order to at least mitigate the amount of residue and cloudy suspension produced, and then, optionally, to supply additional zirconium in any instances where residue or suspension does remain.

Besides promoting more complete dissolution, $Zr^{+4}$ so incorporated in the metathesate solution in accordance with this invention has proven to be also especially effective in enhancing subsequent oxidation of any $Pu^{+4}$ values present. As alluded to hereintofore, a marked reduction of the oxidizability of $Pu^{+4}$ values involved is another serious difficulty which generally obtains in using previously-conventional metathesis techniques. Specifically, appreciable portions of $Pu^{+4}$ which appear properly dissolved in the $LaF_3$-metathesate solution, under such circumstances, ordinarily will not be oxidized by oxidation procedures which otherwise generally afford virtually complete plutonium oxidation. Such oxidation resistance, seemingly metathesis-induced, seriously detracts from the efficiency of the discussed lanthanum fluoride plutonium decontamination cycle. However, applicants have discovered that when their outlined zirconium incorporation procedure is applied to the metathesis operation, the $Zr^{+4}$ thereupon in the solution tends to reduce such oxidation resistance and restore the $Pu^{+4}$ to normal oxidizability. The proportions of $Pu^{+4}$ that become oxidized, upon applying conventional oxidation procedures, are appreciably increased by the presence of such incorporated $Zr^{+4}$, often to the point of fully quantitative oxidation.

Investigating this oxidation improvement benefit further, it seems that, again, any amount, however small, of $Zr^{+4}$ incorporated in the system will normally exert at least some beneficial effect toward enhancing oxidation. Likewise, the effectiveness of $Zr^{+4}$ for this purpose increases with its concentration. Also, since the degree of oxidation resistance prevailing is usually difficult to predict in advance, ample excesses of $Zr^{+4}$ are advisable to insure complete oxidation. Similarly, as a guide to suitable quantities of $Zr^{+4}$, it has been found that where metathesis has been carefully conducted in accordance with the particular conventional procedures detailed hereintofore, significant practical enhancement in $Pu^{+4}$ oxidizability is realizable by employing $Zr^{+4}$ concentrations ranging up from as low as about ½ gram per liter. Increasing the $Zr^{+4}$ concentrations above this level, oxidation by the conventional dichromate or peroxydisulfate oxidation procedures hereintofore described were found to often become substantially quantitative even before the $Zr^{+4}$ concentration is fully raised to the particularly preferred 3 gm. $Zr^{+4}$/liter. It is anticipated that in many instances, adequate $Zr^{+4}$ concentrations of this low order will have been earlier incorporated in the solution to aid dissolution, thus enabling virtually complete oxidation to be achieved without further addition of $Zr^{+4}$ at this point being necessary.

Such use of the present $Zr^{+4}$ addition to merely complement the metathesis operation, rather than to fully replace it, is particularly applicable to improving lanthanum fluoride plutonium cycles already in plant-scale operation. Advantageously, in so doing, substantially no apparatus or operational changes need be involved, other than simply adding $ZrO(NO_3)_2$, say dissolved in a small amount of $HNO_3$, to the dissolving solution. After such addition, no further changes in any of the procedural operations throughout the cycle are necessary. The presence of the $Zr^{+4}$ in the solution then imparts its benefits to the conventional dissolution and oxidation operations, without interfering with the remainder of the cycle. By-product precipitation is satisfactorily effected from the zirconium-containing solution, as before, by simply increasing the fluoride ion content, say by HF addition, to override the zirconium concentration and precipitate the lanthanum. Since the zirconium concentrations at this point are normally much smaller than those met in cases where Zr-dissolution fully replaces metathesis, there is usually no significant fluoride co-precipitation of the incorporated zirconium. Finally, reduction and product precipitation proceed in the usual manner, showing no deleteriously-great sensitivity to the zirconium present. Thus, by applying the present method in this manner too, such lanthanum fluoride plutonium cycles are significantly improved with respect to enhanced dissolution and oxidation, without otherwise markedly interfering with the normal conduct of the cycle.

Further illustration of the quantitative aspects and preferred procedures of the present method is provided in the following specific examples. In Example I dissolution of plutonium-carrying $LaF_3$ precipitates by the present zirconium method is compared with that by typical metathesis procedures conventional for the purpose.

EXAMPLE I

Part A.—Metathesis

A water-washed $LaF_3$ precipitate, containing a trace concentration of plutonium which had previously carrier precipitated therewith, was obtained as a slurry with 13.5 liters of residual wash water per kilogram of $LaF_3$. To equal portions of slurry were added 9.1 liters/kg. $LaF_3$, of either 30% NaOH or 42% KOH (both approximately equal to 10 M), heated to 50° C., and agitated at this temperature for a half hour to metathesize $LaF_3$ to $La(OH)_3$. Each sample was then centrifuged, and a portion of the supernatant decanted and discarded, leaving the $La(OH)_3$ precipitate associated with a solution volume of 13.5 liters/kg. original $LaF_3$. Thereafter, each sample was washed a number of times, as indicated, each wash being conducted by agitating the precipitate slurry 15 minutes at 50° C. with an additional 6.8 liters $H_2O$/kg. of original $LaF_3$ content, centrifuging, and decanting to 13.5 liters/kg. $LaF_3$. After the last wash, all of the remaining supernatant was removed, and the precipitate was agitated for 30 minutes at room temperature with 4.5 liters/kg. original LaF$_3$ of 66% HNO$_3$ to effect dissolution. The acid supernatant was decanted off, and the remaining residue agitated with 4.0 liters/kg. original LaF$_3$ of fresh 66% HNO$_3$ for 30 minutes at room temperature, the acid supernatant decanted, and the still remaining residue washed with 4.0 liters kg. LaF$_3$ of water. Throughout the runs, generally, this wash water was observed to have become particularly cloudy. The two acid supernatants and the final wash water were combined to form a "product solution." Both the product solution and the residue were separately analyzed for Pu, and the amount of unmetathesized LaF$_3$ left in the residue was visually estimated. Results obtained are tabulated in Table I below. In every case, the sum of the Pu contents in both product solution and residue was found to equal at least 90% of the Pu originally in the LaF$_3$ precipitate, indicating that no generally prohibitive losses of Pu had occurred in the discarded supernatants from the metatheses and metathesate washings. To prepare the solutions for subsequent oxidation treatment, their acidity was diluted to 3 N HNO$_3$ by adding 29.6 liters H$_2$O/kg. original LaF$_3$, thereby increasing the product solution volume to 37.6 liters/kg. original LaF$_3$.

*Part B.—Zirconium method*

An essentially identical plutonium-carrying LaF$_3$ precipitate was added to 20 liters/kg. LaF$_3$ of a 3 N HNO$_3$ solution containing 100 gms./liter of Zr$^{+4}$ as zirconyl nitrate. The system was agitated for an hour at room temperature, whereupon the precipitate readily dissolved. An estimation was made of the resulting amount of residue and percentage plutonium which went into solution; the values thereby obtained are likewise tabulated in Table I below.

TABLE I.—DISSOLUTION OF Pu-BEARING LaF$_3$ CARRIER PRECIPITATES

| Dissolution Method | Percentage Pu | | Percentage of Precipitate Volume Remaining Undissolved (Visual Estimate) |
|---|---|---|---|
| | In "Product Solution" | In Residue | |
| A. Metathesis+3 Washes+Dissolution in HNO$_3$: | | | |
| NaOH | 12.8 | 87.2 | |
| KOH | 71 | 29 | |
| Metathesis+6 Washes+Dissolution in HNO$_3$: | | | 10–25. |
| NaOH | 11.6 | 88.4 | |
| | 12.9 | 87.1 | |
| KOH | 55 | 45 | |
| | 53 | 47 | |
| B. Zirconium Method | >95 | | (Substantially no bulk residue remained). |

The efficacy of the present zirconium method, and the improvement it affords over the use of metathesis procedures is clearly evidenced by the results set forth in Table I. In addition to the far greater thoroughness and simplicity exhibited by the zirconium method, it is also especially noteworthy that the volume of 3 N HNO$_3$ product solution derived thereby was only about half of that obtained through metathesis. This is a particularly beneficial attribute for plutonium production applications, where minimization of dissolving solution volume is continually striven for in the interest of concentrating the extremely dilute plutonium.

In Example II, use of the present zirconium method to complement dissolution by conventional metathesis procedures is demonstrated.

EXAMPLE II

A second series of dissolving runs were made, identical in every respect with the runs made in Part A of Example I, with the single exception that the addition of the second (4.0 liters/kg. original LaF$_3$) portion of 66% HNO$_3$ acid solution employed was in every case accompanied by 25 grams of Zr$^{+4}$ per liter of the 66% HNO$_3$. The Zr$^{+4}$ was supplied in the form of zirconyl nitrate dissolved in the 66% HNO$_3$ solution. No noticeable cloudiness was observed in the final water washings of the residue, or in the product solution either before or after dilution. In every case a small amount of residue remained; however, it was found that such residue generally was not constituted predominantly of LaF$_3$, as was the residue that remained in the Example I runs, but comprised for the most part a small, black deposit of reagent impurities occurring in these semi-works scale operations. The results obtained upon analysis of the product solutions and residues, and estimation of the residue volumes are tabulated in Table II below.

TABLE II.—DISSOLUTION OF Pu-BEARING LaF$_3$ CARRIER PRECIPITATES BY Zr$^{+4}$-ASSISTED METATHESIS PROCEDURE

| Dissolution Method | Percentage Pu | | Percent Ppt. Volume Remaining Undissolved (Visual Estimate) |
|---|---|---|---|
| | In "Product Solution" | In Residue | |
| Metathesis+3 Washes+Dissolution in (HNO$_3$+100 gm. Zr$^{+4}$/kg. orig. LaF$_3$): | | | |
| NaOH | 90 | 10 | |
| KOH | 97 | 3 | |
| Metathesis+6 Washes+Dissolution in (HNO$_3$+100 gm. Zr$^{+4}$/kg. orig. LaF$_3$): | | | 0–5 |
| NaOH | 93.3 | 6.7 | |
| | 94.5 | 5.5 | |
| KOH | 97 | 3 | |
| | 98 | 2 | |

By comparing the data in Table II above with those in Part A of Table I, the radical improvement of dissolution by metathesis procedures afforded by incorporating the present zirconium method therewith may be clearly perceived. In every instance, the percentages both of plutonium and of total precipitate which were dissolved were as high as 90% and above. It is of interest that metathesis dissolution in these runs was effected by successively contacting each metathesized precipitate with a plurality of fresh portions of acid—a technique which had been conventionally practiced previously in attempting to increase the amount of precipitate and plutonium dissolved. However, other experiments have shown that dissolution efficiencies of this same high order were obtained where all of the 66% HNO$_3$, together with the Zr$^{+4}$, was simply admixed with the precipitate in a single step, and the solution thereafter diluted, while permitting the residue to remain unremoved in contact with the solution.

In Example III, the effectiveness of the presence of Zr$^{+4}$ in overcoming metathesis-induced resistance to oxidation is investigated. Here the oxidation improvement effect is studied independently of the dissolution improvement phenomena. Various concentrations of Zr$^{+4}$ were established in samples of conventionally acid-dissolved metathesis solutions, whereupon oxidation procedures were applied, and the proportion of the contained Pu which was oxidized then analytically determined.

EXAMPLE III

A series of essentially identical semi-works scale metathesis and acid dissolution runs were made. Each run was conducted substantially as follows. A LaF$_3$ carrier precipitate, containing a trace concentration of plutonium which had previously carrier precipitated therewith, was admixed with water to form a LaF$_3$ slurry comprising ca. 2.67 gms. La$^{+3}$/liter. To this slurry ca. 55 grams of KOH were added per gram of La$^{+3}$, in the form of a 35% by weight aqueous solution. The resulting slurry, ca. 2 gm./l. in $La^{+3}$ and 10% in KOH, was agitated for an hour at 75° C., cooled, centrifuged, and the supernatant decanted during centrifugation, leaving a 1%, by volume, heel containing the resulting $La(OH)_3$ precipitate. The $La(OH)_3$ heel was reslurried in a volume of 0.5% KOH equal to the former volume of the 10% KOH slurry, agitated for an hour at room temperature, centrifuged, and supernatant decanted during centrifugation, again leaving a 1% heel containing the $La(OH)_3$ precipitate. Acid dissolution of $La(OH)_3$ was effected by admixing the final $La(OH)_3$ heel with 13.85 cc. of 70% $HNO_3$ per gram of $La^{+3}$. The resulting solution was thereupon dilute to 5.0 N $HNO_3$; some non-dissolving residue still remained at the bottom of the solution vessel. Samples of this diluted solution, found to contain ca. 25 gm. $La^{+3}$ and ca. 0.5 milligram of $Pu^{+4}$ per liter, were removed for oxidation tests.

Into several samples of the solution derived in each metathesis run, different zirconium concentrations were incorporated by addition of amounts of a 3 N $HNO_3$ solution containing 50 gm. $Zr^{+4}$/liter in the form of dissolved zirconyl nitrate. The samples were thereupon diluted to 1.0 N $HNO_3$, whereupon they contained the indicated concentrations of $Zr^{+4}$. Oxidation of the $Pu^{+4}$ was then effected by incorporating a 0.1 N $Na_2Cr_2O_7$ concentration in each sample, and maintaining a temperature of 85° C. for 2 hours. Thereupon, each sample was analyzed for proportion of Pu oxidized to the hexavalent state. The results are tabulated in Table III below.

TABLE III.—OVERCOMING METATHESIS-INDUCED OXIDATION RESISTANCE WITH $Zr^{+4}$
[1 N $HNO_3$; 5 gm. $La^{+3}$/l.; 0.1 N $Cr_2O_7^-$; 85° C., 2 hrs.]

| Metathesis Run No. | Percent Pu Oxidized | | | | |
|---|---|---|---|---|---|
| | 0 gm./ l. $Zr^{+4}$ | 0.5 gm./ l. $Zr^{+4}$ | 1 gm./ l. $Zr^{+4}$ | 2 gm./ l. $Zr^{+4}$ | 3 gm./ l. $Zr^{+4}$ |
| 1 | 21 | 14 | 25 | 78 | 89 |
| 2 | 15 | 17 | 56 | 96 | 97 |
| 3 | 11.2 | 23 | 36 | 72 | 87 |
| 4 | 13.6 | 50 | 85 | 97 | 97 |
| 5 | | 51 | 79 | 97 | 96 |
| 6 | 34 | 77 | 98 | 97 | 98 |
| 7 | 7.3 | 91 | 98 | 96 | 97 |
| 8 | 17.8 | 95 | 98 | 97 | 98 |

The effect of zirconium in enhancing Pu oxidation is well demonstrated by the results of Example III. The preferred 3 gm. $Zr^{+4}$/liter concentration is seen to be generally adequate for enabling substantially complete oxidation under the conditions tested. While the present $Zr^{+4}$ addition method may satisfactorily be employed solely for Pu oxidation improvement, proceeding as in Example III, it has been found to be of greater advantage to add the $Zr^{+4}$ during the metathesate dissolving operation, so as to aid dissolution, along with enhancing oxidation, with the single zirconium addition. Establishing a zirconium concentration in the solution during the dissolving step in this manner generally reduces, and often wholly eliminates, the amount of $Zr^{+4}$ which need later be added at the beginning of the oxidation step to enable virtually complete oxidation.

While this invention has been described with particular reference to its application to the processing of specifically $Pu^{239}$ through conventional lanthanum fluoride cycles, it is inherently of much wider applicability. The present method is equally well adapted to such processing of other plutonium isotopes, for example the non-fissionable $Pu^{238}$ isotope. $Pu^{238}$, valuable as a radioactive tracer, may be derived from non-fissionable sources through application of lanthanum fluoride carrier precipitation processes wherein the present method may be advantageously employed in the described manner. Furthermore, applicability is not at all restricted to conventional lanthanum fluoride cycles, but beneficially extends to the dissolution of plutonium-carrying lanthanum fluoride carrier precipitates generally, irrespective of the specific processes in which they arise.

More broadly, the present invention is not necessarily limited even to plutonium processing. The invention provides a new and improved method for dissolving lanthanum fluoride precipitates. As such, the method is efficacious in dissolving lanthanum fluoride precipitates generally, regardless of whether they are carrying plutonium, sub-macroscopic amounts of other materials, or nothing at all. In fact, the present method may be effectively applied to dissolution of any comminuted, solid lanthanum fluoride, regardless of whether it were derived by precipitation or otherwise. Various additional applications of the hereinbefore-disclosed methods will become apparent to those skilled in the art. It is therefore to be understood that all matters contained in the above description and examples are illustrative only and do not limit the scope of the present invention.

What is claimed is:

1. A method for dissolving a lanthanum fluoride precipitate which comprises contacting said precipitate with an aqueous acidic solution of tetravalent zirconium in a cationic state, thereby effecting dissolution of said precipitate therein.

2. A method for dissolving a lanthanum fluoride carrier precipitate carrying plutonium values which comprises contacting said precipitate with an aqueous acidic solution of tetravalent zirconium in a cationic state, thereby effecting dissolution of said precipitate, together with said carried plutonium values, therein.

3. A method for dissolving a lanthanum fluoride carrier precipitate which comprises contacting said precipitate with an aqueous nitric acid solution of zirconyl nitrate, thereby effecting dissolution of said precipitate therein.

4. A method for dissolving a lanthanum fluoride carrier precipitate carrying plutonium values, which comprises contacting said precipitate with an aqueous nitric acid solution of zirconyl nitrate, thereby effecting dissolution of said precipitate, together with said carried plutonium values, therein.

5. A method for dissolving a lanthanum fluoride precipitate which comprises contacting said precipitate with an aqueous nitric acid solution containing a weight of tetravalent zirconium, in dissolved cationic state, at least as great as the weight of lanthanum in the precipitate, thereby effecting dissolution of said precipitate therein.

6. A method for dissolving a lanthanum fluoride precipitate which comprises intimately contacting said precipitate with at least approximately one liter, per 140 grams of said precipitate, of an aqueous nitric acid solution containing dissolved therein an amount of zirconyl nitrate at least as great as to provide a weight ratio of dissolved zirconium to lanthanum in the precipitate of approximately 1:1, thereby effecting dissolution of said precipitate therein.

7. A method for dissolving a lanthanum fluoride precipitate which comprises intimately contacting said precipitate with at least approximately one liter, per 140 grams of said precipitate, of an aqueous, substantially one normal nitric acid solution containing dissolved therein an amount of zirconyl nitrate at least as great as to provide a weight ratio of dissolved zirconium to lanthanum in the precipitate of approximately 1:1, thereby effecting dissolution of said precipitate therein.

8. A method for dissolving a lanthanum fluoride carrier precipitate carrying plutonium values, which comprises intimately contacting said precipitate with at least approximately one liter, per 140 grams of said precipitate, of an aqueous, substantially one normal nitric acid solution containing dissolved therein an amount of zirconyl nitrate at least as great as to provide a weight ratio of dissolved zirconium to lanthanum in the precipitate of approximately 1:1, thereby effecting dissolution of said precipitate, together with said plutonium values, therein.

9. In a process for the derivation, from a lanthanum fluoride carrier precipitate carrying tetravalent plutonium values, of an aqueous solution containing dissolved therein said tetravalent plutonium values, said solution being subsequently subjected to an oxidation procedure to oxidize tetravalent plutonium values dissolved therein to the hexavalent state, the improved method for effecting said derivation which comprises intimately contacting said precipitate with an aqueous nitric acid solution of tetravalent zirconium in a dissolved cationic state, thereby effecting dissolution of said precipitate therein and enhancing the efficacy of said oxidation procedure.

10. In processes for the derivation of an aqueous lanthanum solution from a lanthanum fluoride precipitate comprising converting said lanthanum fluoride precipitate to substantially a lanthanum hydroxide precipitate by a metathesis reaction effected by means of contacting the lanthanum fluoride with an aqueous alkali hydroxide solution, thereupon separating the consequently-converted precipitate from its supernatant solution, and then admixing the separated precipitate with an aqueous acidic solution to thereby dissolve it therein, the improvement step which comprises incorporating in said aqueous acidic solution, tetravalent zirconium in a dissolved cationic state.

11. In processes for the derivation of an aqueous solution from a lanthanum fluoride precipitate comprising converting said lanthanum fluoride precipitate to substantially a lanthanum hydroxide precipitate by a metathesis reaction effected by means of contacting the lanthanum fluoride with an aqueous alkali hydroxide solution, thereupon separating the consequently-converted precipitate from its supernatant solution, and then intimately contacting the separated precipitate with an aqueous nitric acid solution to dissolve it therein, the improvement step which comprises incorporating in said nitric acid solution and maintaining therein during said intimate contacting tetravalent zirconium in a dissolved cationic state, thereby improving the dissolution of said separated precipitate.

12. In processes for the derivation of an aqueous hexavalent-plutonium solution from a lanthanum fluoride carrier precipitate carrying tetravalent plutonium values, comprising converting said lanthanum fluoride precipitate to substantially a lanthanum hydroxide precipitate retaining said plutonium values, by a metathesis reaction effected by means of contacting the lanthanum fluoride with an aqueous alkali hydroxide solution, thereupon separating consequently-converted plutonium-containing precipitate from its supernatant solution, then intimately contacting the separated precipitate with an aqueous nitric acid solution to dissolve it, along with contained tetravalent plutonium values, therein, and thereafter subjecting said acid solution to an oxidation procedure to oxidize tetravalent plutonium values consequently dissolved therein to the hexavalent state, the improvement step which comprises incorporating in said acid solution and maintaining therein during said intimate contacting and said oxidation procedure, tetravalent zirconium in a dissolved cationic state, thereby contemporaneously effecting improved dissolution of said separated precipitate and enhancing the efficacy of said oxidation procedure.

13. In processes for the derivation of an aqueous hexavalent-plutonium solution from a lanthanum fluoride carrier precipitate carrying tetravalent plutonium values, comprising converting said lanthanum fluoride precipitate to substantially a lanthanum hydroxide precipitate retaining said plutonium values, by a metathesis reaction effected by means of contacting the lanthanum fluoride with an aqueous alkali hydroxide solution, thereupon separating consequently-converted plutonium-containing precipitate from its supernatant solution, then intimately contacting the separated precipitate with an aqueous nitric acid solution to dissolve it, along with contained tetravalent plutonium values, therein, and thereafter subjecting said acid solution to an oxidation procedure to oxidize tetravalent plutonium values dissolved therein to the hexavalent state, the improvement step which comprises maintaining in said acid solution during said oxidation procedure, an incorporated amount of tetravalent zirconium in a dissolved cationic state, thereby enhancing the efficacy of said oxidation procedure.

14. In processes for the derivation of an aqueous solution from lanthanum fluoride precipitate, comprising converting said lanthanum fluoride precipitate to substantially a lanthanum hydroxide precipitate by a metathesis reaction effected by means of contacting the lanthanum fluoride with an aqueous alkali hydroxide solution, thereupon separating the consequently-converted precipitate from its supernatant solution, and then intimately contacting the separated precipitate with an aqueous nitric acid solution to dissolve it therein, the improvement step which comprises incorporating in said nitric acid solution and maintaining therein during said intimate contacting, an amount of zirconyl nitrate dissolved therein equivalent to at least a weight ratio of dissolved zirconium to lanthanum in the precipitate of at least approximately 1:10, thereby improving the dissolution of said separated precipitate.

15. In processes for the derivation of an aqueous hexavalent-plutonium solution from a lanthanum fluoride carrier precipitate carrying tetravalent plutonium values, comprising converting said lanthanum fluoride precipitate to substantially a lanthanum hydroxide precipitate retaining said plutonium values, by a metathesis reaction effected by means of contacting the lanthanum fluoride with an aqueous alkali hydroxide solution, thereupon separating consequently-converted plutonium-containing precipitate from its supernatant solution, then intimately contacting the separated precipitate with an aqueous nitric acid solution to dissolve it, along with contained tetravalent plutonium values, therein, and thereafter subjecting said acid solution to an oxidation procedure to oxidize tetravalent plutonium values dissolved therein to the hexavalent state, the improvement step which comprises maintaining dissolved in said acid solution during said oxidation procedure, an incorporated amount of zirconyl nitrate equivalent to a $Zr^{+4}$ concentration of at least approximately 3 grams per liter, thereby enhancing the efficacy of said oxidation procedure.

References Cited in the file of this patent

UNITED STATES PATENTS 2,514,115   Angerman _____ July 4, 1950